US006867325B2

(12) United States Patent
Kato et al.

(10) Patent No.: US 6,867,325 B2
(45) Date of Patent: Mar. 15, 2005

(54) ORGANOSILOXANE POLYMER, PHOTO-CURABLE RESIN COMPOSITION, PATTERNING PROCESS, AND SUBSTRATE-PROTECTING COAT

(75) Inventors: Hideto Kato, Gunma-ken (JP); Satoshi Asai, Gunma-ken (JP); Toshihiko Fujii, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 194 days.

(21) Appl. No.: 10/212,253

(22) Filed: Aug. 6, 2002

(65) Prior Publication Data
US 2003/0064168 A1 Apr. 3, 2003

(30) Foreign Application Priority Data

Aug. 6, 2001 (JP) ......................................... 2001-237912

(51) Int. Cl.[7] ............................. C07F 7/02; C07F 7/08; C07F 7/10
(52) U.S. Cl. ........................... 560/439; 522/99; 528/15; 528/35; 560/420
(58) Field of Search ................................ 560/420, 439; 522/99; 528/15, 35

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,775,452 A | 11/1973 | Karstedt | |
| 6,211,322 B1 * | 4/2001 | Dohler et al. | 528/15 |
| 6,239,246 B1 * | 5/2001 | Takahashi et al. | 528/32 |

FOREIGN PATENT DOCUMENTS

JP 04-136860 5/1992

OTHER PUBLICATIONS

Yasuyuki et al., Patent Abstracts of Japan, Japan Appln. No. 04–136860, May 11, 1992.

* cited by examiner

Primary Examiner—Peter O'Sullivan
(74) Attorney, Agent, or Firm—Millen, White, Zelano & Branigan, P.C.

(57) ABSTRACT

An organosiloxane polymer comprising recurring units of the general formula (1) and having a weight average molecular weight of 1,000–500,000 is novel.

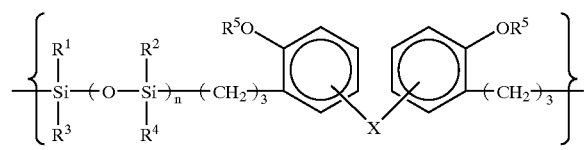

(1)

$R^1$ to $R^4$ are monovalent hydrocarbon groups, n is an integer of 1–2,000, X has a structure of the formula:

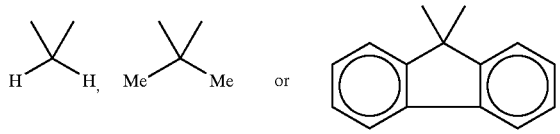

and $R^5$ is an acrylic functional organic group of the formula:

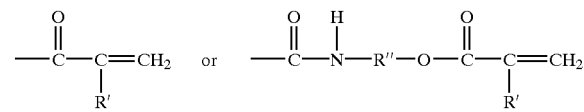

wherein R' is H or methyl and R" is a divalent hydrocarbon group. A photo-curable resin composition comprising the organosiloxane polymer and a sensitizer can be cured with a wide wavelength range of light.

4 Claims, No Drawings

ORGANOSILOXANE POLYMER, PHOTO-CURABLE RESIN COMPOSITION, PATTERNING PROCESS, AND SUBSTRATE-PROTECTING COAT

This invention relates to an organosiloxane polymer, a photo-curable resin composition comprising the same, a patterning process, and a substrate-protecting coat.

BACKGROUND OF THE INVENTION

Organosiloxane base photo-curable resin compositions are generally useful as protective coating, insulating coating and release coating and also advantageous as micropatterning photoresist and analogous materials.

Prior art negative working, acrylic, organosiloxane base photo-curable resin compositions have drawbacks such as a relatively low hardness in the cured state and insufficient patterning capability.

One known micropatterning resist material is a resin composition comprising a cresol novolac resin or polyhydroxystyrene resin, alkoxymethylated amino resin, and a photoacid generator as disclosed in JP-A 4-136860. However, the resist formed from this resin composition is less resistant to oxygen dry etching. Also, when applied as a protective insulating material onto a substrate, the composition has a crucial problem of less adhesion to the substrate.

SUMMARY OF THE INVENTION

An object of the invention is to provide a novel organosiloxane polymer, a photo-curable resin composition comprising the same which is adapted to be exposed to light in a wide wavelength range, a process of patterning the composition to form a micropattern having dry etching resistance, and a substrate-protecting coat having a high dielectric strength and good adhesion to a substrate.

It has been found that a photo-curable resin composition comprising an organosiloxane polymer comprising recurring units of the general formula (1) shown below and having a weight average molecular weight of 1,000 to 500,000 can be exposed to light in a wide wavelength range and easily form a thin film without oxygen attacks, that a micropattern having improved dry etching resistance can be formed from the photo-curable resin composition by a patterning process to be described later, and that a cured coat obtained from the photo-curable resin composition by the patterning process has improved adhesion to a substrate, heat resistance and electric insulation.

In a first aspect, the present invention provides an organosiloxane polymer comprising recurring units of the general formula (1) and having a weight average molecular weight of 1,000 to 500,000.

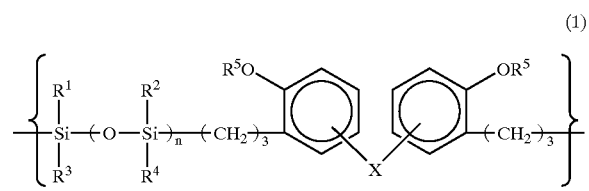

In formula (1), each of $R^1$ to $R^4$ which may be the same or different is a monovalent hydrocarbon group having 1 to 10 carbon atoms, n is an integer of 1 to 2,000, X has a structure of the formula:

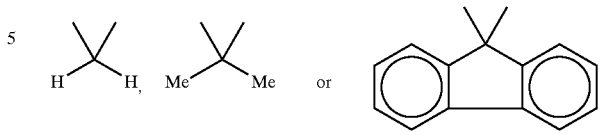

wherein Me is methyl, and $R^5$ which may be the same or different is an acrylic functional organic group of the formula:

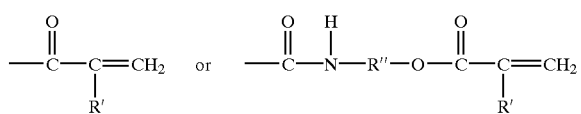

wherein R' is hydrogen or methyl and R" is a divalent hydrocarbon group having 1 to 10 carbon atoms.

In a second aspect, the invention provides a photo-curable resin composition comprising the organosiloxane polymer defined above and an effective amount of a sensitizer and/or photo-polymerization initiator, which are dissolved in an organic solvent.

In a third aspect, the invention provides a patterning process comprising the steps of (i) applying the photo-curable resin composition to a substrate to form a coating, (ii) exposing the coating to light having a wavelength of 150 to 450 nm through a photomask, and (iii) developing the exposed coating with a developer.

In a fourth aspect, a substrate-protecting coat obtained by post curing the coating which has been patterned by the above process is provided.

DESCRIPTION OF THE PREFERRED EMBODIMENTS

The organosiloxane polymer of the present invention is defined as comprising recurring units of the general formula (1) and having a weight average molecular weight of 1,000 to 500,000.

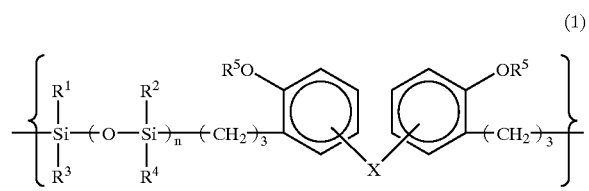

In formula (1), each of $R^1$ to $R^4$ which may be the same or different is a monovalent hydrocarbon group having 1 to 10 carbon atoms, preferably 1 to 8 carbon atoms, for example, straight, branched or cyclic alkyl groups such as methyl, ethyl, propyl, isopropyl, n-butyl, tert-butyl and cyclohexyl, straight, branched or cyclic alkenyl groups such as vinyl, allyl, propenyl, butenyl, hexenyl and cyclohexenyl, aryl groups such as phenyl and tolyl, and aralkyl groups such as benzyl and phenylethyl.

X has a structure as represented by the following formulae.

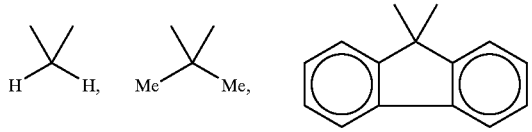

Herein Me is methyl.

R⁵ which may be the same or different is an acrylic functional organic group as represented by the following formulae.

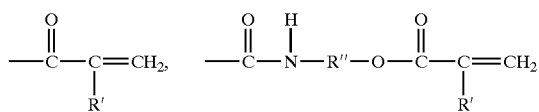

Herein R' is hydrogen or methyl and R" is a divalent hydrocarbon group having 1 to 10 carbon atoms, preferably 1 to 8 carbon atoms, for example, alkylene groups such as methylene, ethylene, propylene, tetramethylene and hexamethylene, arylene groups such as phenylene, and combinations of such alkylene with arylene.

The subscript n is an integer of 1 to 2,000, and preferably 1 to 1,000. Organosiloxane polymers having n in excess of 2,000 become less compatible with the sensitizer or photo-polymerization initiator to be described later and insufficiently photo-curable.

The organosiloxane polymer of the invention should have a weight average molecular weight (Mw) of 1,000 to 500,000, and preferably 1,500 to 300,000. Polymers with Mw of less than 1,000 are insufficiently photo-curable whereas polymers with Mw in excess of 500,000 become less compatible with the sensitizer or photo-polymerization initiator.

The organosiloxane polymer of the invention can be produced, for example, by effecting "hydrosilylation" polymerization between an allyl group-containing phenol compound of the formula (2) and an organohydrosiloxane of the formula (3) in the presence of a catalyst, and reacting an acrylic acid or acrylic halide of the formula (4) or an isocyanate acrylate compound of the formula (5) with the phenol moiety of the polymerization product, the formulae being shown below.

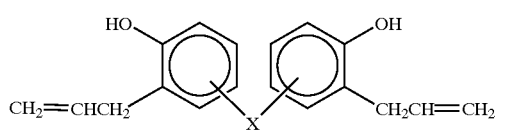

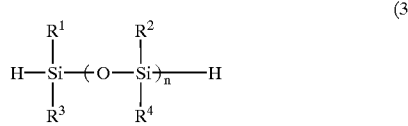

X, R¹ to R⁴ and n are as defined above.

Y is a halogen atom or hydroxyl group, R' and R" are as defined above.

The organohydrosiloxane of the formula (3) can be produced as a desired oligomer or prepolymer, for example, by subjecting a corresponding organohydrosiloxane monomer to condensation reaction under appropriate conditions.

At the end of the polymer of the invention, an allyl group (—CH$_2$CH=CH$_2$) arising from formula (2) and a hydrosilyl group (—SiR$^1$R$^3$H or —SiR$^2$R$^4$H) arising from formula (3) are present admixed in a proportion corresponding to the molar ratio of the compounds of formulae (2) and (3).

The weight average molecular weight of the organosiloxane polymer comprising recurring units of formula (1) according to the invention can be easily controlled by adjusting the ratio of the total number of allyl groups in the phenol compound of formula (2) to the total number of hydrosilyl groups in the organohydrosiloxane of formula (3), that is, total allyl group/total hydrosilyl group. Therefore, the phenol compound of formula (2) and the organohydrosiloxane of formula (3) may be mixed in the above polymerization reaction compositional ratio, so as to give a total allyl group/total hydrosilyl group ratio predetermined to provide a desired weight average molecular weight. More specifically, the total allyl group/total hydrosilyl group ratio to provide the organosiloxane polymer comprising recurring units of formula (1) with a desired weight average molecular weight of 1,000 to 500,000 is preferably in the range from 0.5 to 2, and especially from 0.8 to 1.2. Therefore, the phenol compound of formula (2) and the organohydrosiloxane of formula (3) may be mixed so as to give a ratio in this range.

Examples of the catalyst used in the polymerization reaction between the phenol compound and the organohydrosiloxane include platinum group metals such as platinum (inclusive of platinum black), rhodium and palladium; platinum chloride, chloroplatinic acid and chloroplatinic acid salts such as H$_2$PtCl$_4$.nH$_2$O, H$_2$PtCl$_6$.nH$_2$O, NaHPtCl$_6$.nH$_2$O, KHPtCl$_6$.nH$_2$O, Na$_2$PtCl$_6$.nH$_2$O, K$_2$PtCl$_4$.nH$_2$O, PtCl$_4$.nH$_2$O, PtCl$_2$, and Na$_2$HPtCl$_4$.nH$_2$O wherein n is an integer of 0 to 6, especially 0 or 6; alcohol-modified chloroplatinic acid (U.S. Pat. No. 3,220,972), complexes of chloroplatinic acid with olefins (U.S. Pat. Nos. 3,159,601, 3,159,662, and 3,775,452); platinum group metals such as platinum black and palladium on carriers such as alumina, silica and carbon; rhodium-olefin complexes; chlorotris(triphenylphosphine)rhodium (known as Wilkinson catalyst); and complexes of platinum chloride, chloroplatinic acid and chloroplatinic acid salts with vinyl-containing siloxanes (especially, vinyl-containing cyclic siloxanes).

In the above polymerization reaction, an organic solvent may be used if necessary. The preferred organic solvents are hydrocarbon series organic solvents such as toluene and xylene.

With respect to the polymerization conditions, the polymerization temperature is preferably, for example, 40 to 150° C., and especially 80 to 120° C. At too low a temperature, a long time may be needed until the completion of polymerization. Too high a temperature can cause the catalyst to be deactivated. The polymerization time depends on the type and quantity of the polymer product. Preferably polymerization is ended within about 0.5 to 10 hours, especially within about 0.5 to 5 hours in order to prevent moisture from entering the polymerization system.

Since organohydrosiloxanes tend to incur disproportionation reaction or side reaction and the hydrosilylation polymerization reaction is generally an exothermic reaction, it is preferred to add the organohydrosiloxane of formula (3) dropwise.

Following the completion of polymerization reaction between the phenol compound and the organohydrosiloxane, the resulting compound is further reacted with the compound of formula (4) or (5) whereby the organosiloxane polymer comprising recurring units of formula (1) according to the invention is obtainable.

Examples of the compound of formula (4) include acrylic acid, methacrylic acid, acrylic chloride, and methacrylic chloride. The isocyanate acrylate of formula (5) can be synthesized by well-known methods, for example, by reacting an appropriate acrylate or methacrylate-substituted oxazoline derivative with phosgene in the presence of a HCl scavenger. Several appropriate isocyanate acrylates are commercially available. For example, isocyanatoethyl methacrylate is commercially available.

For the reaction of the compound resulting from the above polymerization reaction with the compound of formula (4) or (5), the molar ratio of the compound of formula (4) or (5) to hydroxyl groups in the organosiloxane polymer is preferably set in the range from 0.3 to 1.2, especially from 0.8 to 1.1. If this ratio is less than 0.3, a desired curability may not be imparted. If the ratio is more than 1.2, it may become difficult during purification to remove the compound having unreacted acrylic groups.

With respect to the reaction conditions, the reaction temperature is preferably, for example, 0 to 120° C., and especially 50 to 70° C. At too low a temperature, a long time may be needed until the completion of reaction. Too high a temperature can cause thermal polymerization of acrylic groups to form a gel. The reaction time depends on the type and quantity of the reactants. Preferably reaction is ended within about 0.5 to 10 hours, especially within about 0.5 to 5 hours in order to prevent moisture from entering the reaction system.

After the reaction is completed in this way, the reaction product is worked up if desired. When an acid by-product is present at this point, a suitable amount of an amine is added as a scavenger whereby the acid in salt form is removed. Water washing is carried out if necessary. If a solvent is used in the reaction, it is distilled off. Then the organosiloxane polymer comprising recurring units of formula (1) according to the invention is obtained.

According to the second aspect of the invention, the photo-curable resin composition contains (A) the organosiloxane polymer comprising recurring units of formula (1) and (B) a sensitizer and/or photo-polymerization initiator.

The photo-curable resin composition essentially contains an effective amount of a sensitizer and/or photo-polymerization initiator. The sensitizer and photo-polymerization initiator used herein are not critical, and examples thereof include benzophenone, acetophenone, anthron, phenanthrene, nitrofluorene, nitroacenaphthene, p,p'-tetramethyldiaminobenzophenone, p,p'-tetraethyldiaminobenzophenone, chlorothioxanthone, benzanthraquinone, 2,6-bis(4-diethylaminobenzal) cyclohexanone, 2,6-bis(4-diethylaminobenzal)-4-methylcyclohexanone, 4,4'-bis(diethylamino)chalcone, 2,4-diethylthioxanthone, N-phenyl-diethanolamine, diethylaminoethyl methacrylate, coumarin compounds, benzyl, benzoin isopropyl ether, 1-hydroxycyclohexylphenyl ketone, 2-methyl-[4-(methylthio)phenyl]-2-morpholino-1-propanone, 1-phenyl-1,2-butanedione-2-(o-methoxycarbonyl)oxime, N-phenylglycine, 3-phenyl-5-isoxazolone, camphorquinone, and imidazoles. These may be used alone or in admixture.

The sensitizer or photo-polymerization initiator may be used in any appropriate amount, usually in a preferred amount of 0.1 to 20% by weight, and especially 0.5 to 10% by weight based on the weight of the organosiloxane polymer comprising recurring units of formula (1).

The foregoing components are dissolved in an organic solvent to formulate the photo-curable resin composition of the invention. The organic solvent used herein is preferably one in which the inventive organosiloxane polymer is soluble. Examples of suitable organic solvents include ketones such as cyclohexanone, cyclopentanone, and methyl-2-n-amylketone; alcohols such as 3-methoxybutanol, 3-methyl-3-methoxybutanol, 1-methoxy-2-propanol, and 1-ethoxy-2-propanol; ethers such as propylene glycol monomethyl ether, ethylene glycol monomethyl ether, propylene glycol monoethyl ether, ethylene glycol monoethyl ether, propylene glycol dimethyl ether, and diethylene glycol dimethyl ether; and esters such as propylene glycol monomethyl ether acetate, propylene glycol monoethyl ether acetate, ethyl lactate, ethyl pyruvate, butyl acetate, methyl 3-methoxypropionate, ethyl 3-ethoxypropionate, tert-butyl acetate, tert-butyl propionate, and propylene glycol mono-tert-butyl ether acetate. These solvents may be used alone or in admixture. Of these, preference is given to diethylene glycol dimethyl ether and 1-ethoxy-2-propanol in which the sensitizer and photo-polymerization initiator are most soluble, propylene glycol monomethyl ether acetate and ethyl lactate which are safe solvents, and mixtures thereof.

Preferably the solvent is used in amounts of about 50 to 2,000 parts, and more preferably about 100 to 1,000 parts by weight per 100 parts by weight of the solids in the resin composition. Less than 50 parts of the solvent may be insufficient to keep components (A) and (B) compatible with each other whereas more than 2,000 parts of the solvent makes little further improvement in compatibility and may result in a resin composition having too low a viscosity to apply.

In addition to the above-mentioned components, the photo-curable resin composition of the invention may further contain suitable additive components. Typical additives are surfactants which are customarily used for improving applicability. The preferred surfactants are non-ionic surfactants, for example, fluorochemical surfactants such as perfluoroalkylpolyoxyethylene ethanols, fluorinated alkyl esters, perfluoroalkylamine oxides, and fluorinated organosiloxane compounds.

Such surfactants are commercially available, for example, under the trade name of Florade FC-430 and FC-431 (Sumitomo 3M Co., Ltd.), Surflon S-141 and S-145 (Asahi Glass Co., Ltd.), Unidyne DS-401, DS-4031 and DS-451

(Daikin Industries Co., Ltd.), Megaface F-8151 (Dainippon Ink & Chemicals Inc.) and X-70-092 and X-70-093 (Shin-Etsu Chemical Co., Ltd.). Of these, Florade FC-430 and X-70-093 are preferred.

Where the photo-curable resin composition of the invention is used as a resist material or the like, any suitable additive components which are commonly used in resist materials may be added. These additive components may be used in conventional amounts as long as this does not compromise the advantages of the invention.

The photo-curable resin composition of the invention is prepared in a conventional manner. For example, the photo-curable resin composition can be prepared by agitating and mixing the essential components in the organic solvent together with optional additives, and optionally removing solids as by filtration.

The thus prepared photo-curable resin composition of the invention is useful as protective coating, insulative coating and release coating and also advantageously used as micro-patterning photoresist and analogous materials.

In the third aspect, the patterning process of forming a pattern using the photo-curable resin composition according to the invention involves the steps of (i) applying the photo-curable resin composition to a substrate to form a coating, (ii) exposing the coating to light having a wavelength of 150 to 450 nm through a photomask, and (iii) developing the exposed coating with a developer.

In the patterning process of the invention, the photo-curable resin composition is first applied to a substrate to form a coating thereon. The substrate is selected from, for example, silicon wafers and quartz substrates. The application may be carried out by well-known lithography. For example, the composition is applied by conventional coating techniques such as dipping, spin coating, and roll coating. The coating weight may be selected as appropriate for a particular purpose, and preferably to a coating thickness of 0.1 to 100 µm.

In order for effective photo-curing reaction to take place, the coating may be preheated to volatilize off the solvent if desired. Preheating may be effected at about 40 to 140° C. for about 1 to 10 minutes.

Then, the coating is exposed to light having a wavelength of 150 to 450 nm through a photomask whereby the coating is cured. The photomask may be a mask from which a desired pattern is cut off. The photomask is preferably made of a material that shields light in the wavelength range of 150 to 450 nm, for example, chromium.

The light in the wavelength range of 150 to 450 nm is light having various wavelengths emitted by a radiation-emitting apparatus, for example, UV radiation such as g- and i-lines, and deep UV (248 nm, 198 nm), and electron beams. The preferred exposure is 10 to 500 mJ/cm$^2$.

If necessary for increasing development sensitivity, the cured coating may be further heat treated. Such heat treatment following cure may be effected at about 40 to 140° C. for about 0.5 to 10 minutes.

After the curing, development is carried out with a developer. The developer may be any of organic solvents commonly used in the art, for example, isopropyl alcohol.

Development may be carried out by a conventional method, for example, by immersing the exposed coating in the developer. The development is optionally followed by washing and drying, yielding a cured coat having the desired pattern.

The pattern forming process has been described. Where it is unnecessary to form a pattern, that is, it is merely desired to form a uniform thin film, the same process as the above pattern forming process may be conducted except that the photomask is not used.

The photo-cured pattern thus obtained may be utilized as a mask for processing the underlying substrate. The resulting pattern is fully resistant to oxygen plasma due to the inclusion of siloxane bonds and thus very advantageous as the mask.

The resulting pattern or thin film can be heated at about 150 to 250° C. for about 10 minutes to 2 hours using an oven or hot plate, for thereby increasing a crosslinking density and removing residual volatile components. This ensures that the coat has improved adhesion to the substrate, heat resistance, strength and satisfactory electrical properties.

The cured coats obtained from the photo-curable resin compositions are improved in substrate adhesion, heat resistance and electrical insulation and advantageously used as protective film on electrical and electronic parts and semiconductor devices.

EXAMPLE

Synthesis Examples and Examples of the invention are given below together with Comparative Examples by way of illustration and not by way of limitation. All parts are by weight, Mw is weight average molecular weight, and Me is methyl.

Synthesis Example 1

A flask equipped with a stirrer, thermometer, nitrogen inlet and reflux condenser was charged with 43.0 g of 4,4'-(9H-fluoren-9-ylidene)bis[(2-propenyl)phenol], 60 g of toluene, and 0.1 g of chloroplatinic acid and heated at 80° C. Then 13.4 g of 1,3-dihydro-1,1,3,3-tetramethyldisiloxane was added dropwise to the flask. After the dropwise addition, the reaction solution was ripened for one hour at 100° C. It was cooled to 30° C., after which 31.0 g of isocyanate ethyl methacrylate was added dropwise. The reaction solution was ripened for one hour at 60° C. The toluene was then distilled off. The series of operations yielded 83 g of a solid product.

On analysis of the product by IR spectroscopy, no absorption peaks attributable to isocyanate, hydrosilyl and allyl groups appeared, indicating that the reaction had been completed. An absorption peak attributable to a siloxane bond appeared at 1050 cm$^{-1}$. On measurement of molecular weight by gel permeation chromatography (GPC) relative to polystyrene, it had a Mw of 20,000.

As a result of the structural analyses, the product was identified to be an organosiloxane polymer having recurring units shown below.

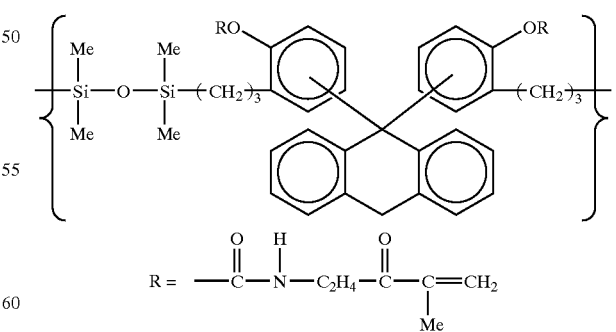

Synthesis Example 2

The procedure of Synthesis Example 1 was repeated aside from using 41.8 g of 4,4'-(9H-fluoren-9-ylidene)bis[(2- propenyl)phenol], 196.0 g of dihydrosiloxanes of the following formula:

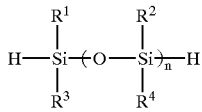

wherein 20% of $R^1$ to $R^4$ are phenyl and 80% are methyl, and n is 19, instead of the 1,3-dihydro-1,1,3,3-tetramethyldisiloxane, and 30.1 g of isocyanate ethyl methacrylate. There was obtained 257 g of a liquid product.

Structural analysis was carried out as in Synthesis Example 1. The product was identified to be an organosiloxane polymer having recurring units shown below and a Mw of 43,000.

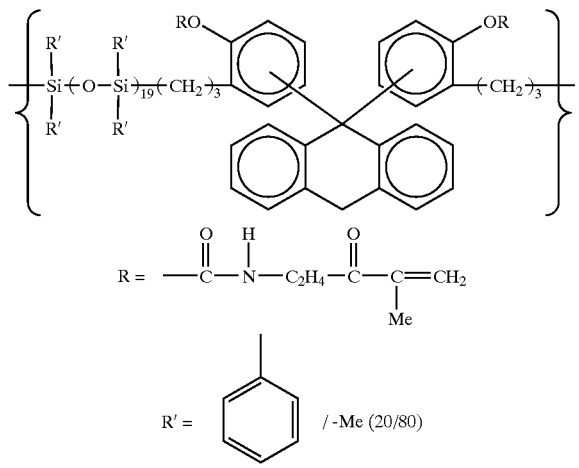

Synthesis Example 3

The procedure of Synthesis Example 2 was repeated aside from using 3.1 g of 4,4'-(1-methylethylidene)bis[(2-propenyl)phenol] instead of the 4,4'-(9H-fluoren-9-ylidene)bis[(2-propenyl)phenol], 741 g of a dihydroxymethylpolysiloxane of the following formula:

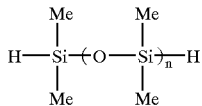

wherein n is 1000, instead of the 1,3-dihydro-1,1,3,3-tetramethyldisiloxane, and 3.1 g of isocyanate ethyl methacrylate. There was obtained 710 g of a liquid product.

Structural analysis was carried out as in Synthesis Example 1. The product was identified to be an organosiloxane polymer having recurring units shown below and a Mw of 250,000.

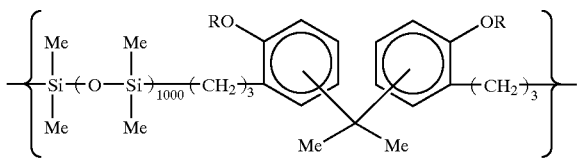

-continued

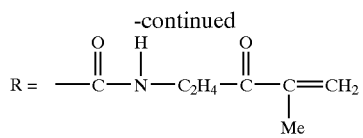

Example 1

A photo-curable resin composition was prepared by blending the organosiloxane polymer prepared in Synthesis Example 1 and a sensitizer or photo-polymerization initiator as shown in Table 1 in a compositional proportion as shown in Table 1, agitating and mixing them, and filtering off solids through a Teflon® filter.

The photo-curable resin composition was spin coated on three silicon wafers to a thickness of 1 μm and 10 μm.

The coatings were heated at 80° C. for one minute for drying (removing the solvent). The coated substrates were exposed to light having a wavelength at an exposure dose as shown in Table 1. After the exposure, the coated substrates were heated at 60° C. for one minute and then cooled.

Thereafter, the coated substrates were immersed in isopropyl alcohol for one minute for development. As a result, cured coats were obtained at a satisfactory film retentivity as shown in Table 1.

Example 2

A photo-curable resin composition was prepared by blending the organosiloxane polymer prepared in Synthesis Example 1 and a sensitizer or photo-polymerization initiator as shown in Table 1 in a formulation proportion as shown in Table 1, agitating and mixing them, and filtering off solids through a Teflon® filter.

As in Example 1, the photo-curable resin composition was coated onto silicon wafers, and the coated substrates were exposed except that exposure was made through a photomask having a stripe pattern.

Thereafter, the coatings were developed with acetone whereby the unexposed areas were dissolved in acetone. As a result, a definite stripe pattern having a line width substantially equal to the thickness was formed. The retentivity of the cured film was satisfactory as shown in Table 1.

Example 3

A photo-curable resin composition was prepared by blending the organosiloxane polymer prepared in Synthesis Example 2 and a sensitizer or photo-polymerization initiator as shown in Table 1 in a formulation proportion as shown in Table 1, agitating and mixing them, and filtering off solids through a Teflon® filter.

As in Example 1, the photo-curable resin composition was coated onto silicon wafers, and the coated substrates were exposed except that exposure was made through a photomask having a stripe pattern.

Thereafter, the coatings were developed with acetone whereby the unexposed areas were dissolved in acetone. As a result, a definite stripe pattern having a line width substantially equal to the thickness was formed. The retentivity of the cured film was satisfactory as shown in Table 1.

Example 4

A photo-curable resin composition was prepared as in Example 1 by blending the organosiloxane polymer prepared in Synthesis Example 3 and a sensitizer or photo-polymerization initiator as shown in Table 1 in a formulation proportion as shown in Table 1.

As in Example 1, the photo-curable resin composition was coated onto silicon wafers, and the coated substrates were exposed except that exposure was made through a photomask having a stripe pattern.

Thereafter, the coatings were developed with acetone whereby the unexposed areas were dissolved in acetone. As a result, a definite stripe pattern having a line width substantially equal to the thickness was formed. The retentivity of the cured film was satisfactory as shown in Table 1.

TABLE 1

| | Composition | | | | | | |
|---|---|---|---|---|---|---|---|
| | Organo-siloxane polymer | Sensitizer/photo-polymerization initiator | Additives | Light source/ exposure | Film retentivity after development | Resolution | Substrate adhesion after post-curing |
| Example 1 | Synthesis Example 1, 100 pbw | 2-methyl-[4-(methylthio)phenyl]-2-morpholino-1-propanone, 1 pbw | propylene glycol monomethyl ether acetate, 150 pbw X-70-093, 0.001 pbw | 365 nm 200 mJ/cm$^2$ | 98% @ 1 μm, 95% @ 10 μm | 2 μmL/S @ 1 μm, 10 μmL/S @ 10 μm | no peel in cross-hatch peel test |
| Example 2 | Synthesis Example 1, 100 pbw | 1-phenyl-1,2-butane-dione-2-(o-methoxy-carbonyl)oxime, 1 pbw | ethyl lactate, 150 pbw FC-430, 0.001 pbw | 436 nm 180 mJ/cm$^2$ | 100% @ 1 μm, 98% @ 10 μm | 3 μmL/S @ 1 μm, 14 μmL/S @ 10 μm | no peel in cross-hatch peel test |
| Example 3 | Synthesis Example 2, 100 pbw | 1-phenyl-1,2-butane-dione-2-(o-methoxy-carbonyl)oxime, 1 pbw | — | 248 nm 150 mJ/cm$^2$ | 97% @ 1 μm, 93% @ 10 μm | 3 μmL/S @ 1 μm, 22 μmL/S @ 10 μm | no peel in cross-hatch peel test |
| Example 4 | Synthesis Example 3, 100 pbw | 2-methyl-[4-(methylthio)phenyl]-2-morpholino-1-propanone, 1 pbw | — | 365 nm 200 mJ/cm$^2$ | 96% @ 1 μm, 92% @ 10 μm | 4 μmL/S @ 1 μm, 24 μmL/S @ 10 μm | no peel in cross-hatch peel test |

The patterned cured coats were post-cured by heating at 180° C. for one hour in a dryer. The adhesion of the cured coats to silicon nitride film and copper was examined by a cross-hatch peel test.

The cured coats of Examples 1 to 4 were satisfactorily adherent to either of the substrates as reported in Table 1. It was confirmed that the cured coats of the inventive compositions are useful as protective film on electronic parts.

Using the novel organosiloxane polymer of the invention, a photo-curable resin composition which is able to be exposed to light in a wide wavelength range can be prepared. Using the composition, a micropattern having dry etching resistance can be formed. A cured coat resulting from the composition has improved substrate adhesion, heat resistance and electric insulation and is thus useful as a protective film on electric and electronic parts and semiconductor devices.

What is claimed is:

1. An organosiloxane polymer comprising recurring units of the general formula (1) and having a weight average molecular weight of 1,000 to 500,000,

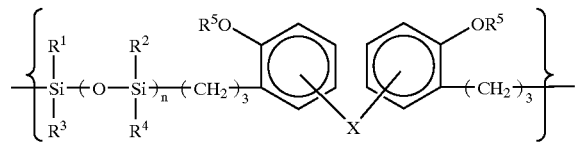

wherein $R^1$ to $R^4$ are each independently a monovalent hydrocarbon group having 1 to 10 carbon atoms, n is an integer of 1 to 2,000, X has a structure of the formula:

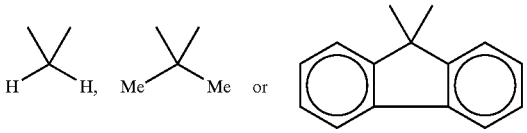

wherein Me is methyl, and $R^5$ is independently an acrylic functional organic group of the formula:

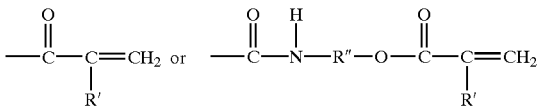

wherein R' is hydrogen or methyl and R" is a divalent hydrocarbon group having 1 to 10 carbon atoms.

2. A photo-curable resin composition comprising the organosiloxane polymer of claim 1, an effective amount of a sensitizer and/or photo-polymerization initiator, and an organic solvent in which the foregoing components are dissolved.

3. A patterning process comprising the steps of:
   (i) applying the photo-curable resin composition of claim 2 to a substrate to form a coating,
   (ii) exposing the coating to light having a wavelength of 150 to 450 nm through a photomask, and
   (iii) developing the exposed coating with a developer.

4. A substrate-protecting coat obtained by post curing the coating which has been patterned by the process of claim 3.

* * * * *